United States Patent
Taylor

[15] 3,698,521
[45] Oct. 17, 1972

[54] FLUID AMPLIFIED LIQUID SPRING SHOCKS AND/OR SHOCK ABSORBERS

[72] Inventor: Paul H. Taylor, 3877 East River Road, Grand Island, N.Y. 14072

[22] Filed: Oct. 30, 1970

[21] Appl. No.: 85,795

Related U.S. Application Data

[62] Division of Ser. No. 764,377, Sept. 30, 1968, abandoned.

[52] U.S. Cl. ..............................................188/306
[51] Int. Cl. ............................................F16d 57/02
[58] Field of Search......188/306, 307, 308, 309, 310; 16/58

[56] References Cited

UNITED STATES PATENTS

| | | | |
|---|---|---|---|
| 1,813,666 | 7/1931 | Elliott | 188/309 |
| 1,970,369 | 8/1934 | Focht | 188/306 |
| 2,027,423 | 1/1936 | Gardiner | 188/308 X |
| 3,361,231 | 1/1968 | Carroll | 188/306 X |

FOREIGN PATENTS OR APPLICATIONS

| | | | |
|---|---|---|---|
| 597,481 | 8/1925 | France | 188/306 |
| 693,875 | 9/1930 | France | 188/306 |

Primary Examiner—George E. A. Halvosa
Attorney—Hume, Clement, Hume & Lee, Ltd.

[57] ABSTRACT

A shock absorber which uses fluid amplification to provide programmed fluid flow and highly efficient shock curves without the necessity of expensive and inefficient metering holes, metering pins, and/or pressure responsive valves is provided by the interaction of: (1) a fluid passage clearance between a shock piston head or vane and the chamber, which houses and is swept by the head or vane, (2) an indentation formed around the periphery of the head or vane, and (3) a plurality of openings between the head or vane and the indentation formed around the periphery of the head or vane.

6 Claims, 15 Drawing Figures

PATENTED OCT 17 1972 3,698,521

FLUID AMPLIFIED LIQUID SPRING SHOCKS AND/OR SHOCK ABSORBERS

CROSS-REFERENCE TO RELATED APPLICATIONS

This application is a division of my earlier application, Ser. No. 764,377, filed Sept. 30, 1968, which is now abandoned.

BACKGROUND OF THE INVENTION

This invention generally relates to shock absorbers which accomplish variations in shock mitigation through fluid amplification without the use of costly, and often inefficient, assemblies such as metering pins, metering holes, metering grooves, metering systems, or pressure responsive valves.

Although there are a number of conventional shock absorbers which use fluids as a dampening medium for shock absorption, such shock absorbers suffer from an array of deficiencies. One such shock absorber, for example, employs a rod, a dashpot head associated with the rod, and a chamber which houses the rod and head and which is traversed by the movement of the head and rod. Such absorbers also typically have an orifice or plurality of orifices communicating with each side of the chamber to permit fluid flow through the orifices and between points in the chamber which are separated by the dashpot head. As the dashpot head sweeps the chamber, energy is absorbed.

Another type of shock absorber employs an inner shock tube which is housed within a larger diameter cylinder. The inner shock tube houses a dashpot head while the space between the inner tube and outer cylinder forms an external gas reservoir to accomodate piston rod displacement. Typically, the inner tube has a series of metering holes of the same or diminishing size, radially spaced along the length of the inner tube or conversely a series of the same size holes spaced progressively at increased distances along the inner tube. The effect of the metering holes in each instance, however, is to cut off the flow of fluid in direct proportion to the diminishing velocity of the dashpot head.

Yet another type of shock absorber employs precisely tapered metering pins to provide gradual diminishing fluid flow in the shock absorber. Such shock absorbers, for example, typically utilize metering pins which pierce a metering hole and which co-act with the hole when submersed in fluid.

Finally, other types of shock absorbers employ a plurality of pressure responsive valves instead of either metering holes or metering pins in an effort to accomplish uniform predetermined fluid flow and shock resistance in shock absorbers. Typically, such pressure responsive valves open at fixed pressures to provide uniform predetermined shock resistance or a square energy card. The most common type of shock absorber which uses pressure responsive valves is the telescoping automobile shock absorber or older vane-type shock absorbers. Generally, in these shock absorbers, one pressure responsive valve is set to open upon compression of the piston rod and head and another valve is set to open to a control position upon rebound. Typically, plate type valves, similar to a Belleville spring washer, are used in such absorbers although it is known that balls with coil springs can also be used as a suitable pressure responsive valve.

In any case, each of the conventional shock absorbers referred to above suffer from a number of deficiencies. For example, the shock absorbers which use a plurality of orifices to communicate between opposite sides of the swept chamber have been observed to produce inefficient shock curves when compared with absorbers producing square wave curves. Similarly, shock absorbers using an inner tube, an outer cylinder, and metering holes have been observed to produce square top waves at one specific design velocity, but, in some cases, produce peaks as the dashpot head passes the metering holes. In effect, therefore, a series of step-type shock curves are produced. In addition, the use of extra tubes and metering holes has proved costly and inefficient. Shock absorbers having metering pins have also proved costly, and in many cases, inefficient. Metering pins, for example, have often gone eccentric, causing erratic metering and fluid flow in the shock absorber. Finally, shock absorbers employing pressure responsive valves have experienced difficulties when the cracking or opening pressure for the valves exceeds the operating resistance for the absorber as, for example, when the ball or plate valve exposes more area after the orifice is open, thereby requiring less fluid pressure to hold the valve open.

SUMMARY OF THE INVENTION

In accordance with this invention, a new and improved shock absorber is provided by utilizing a piston head or vane characterized by having a fluid passage clearance between the piston head or vane and the chamber which houses and is swept by the head or vane, an indentation formed around the peripheral surface of the head or vane adjacent the walls of the chamber, and a plurality of orifices or openings formed between and interconnecting the transverse surface of the head or vane and the indentation in the peripheral surface of the head or vane, so that the high velocity fluid flow through the fluid passage clearance entrains fluid flowing through the openings which interconnect the transverse surface of the head or vane and the indentation formed in the peripheral surface of the head or vane.

Accordingly, the principal object of this invention is to replace pressure responsive valves in a shock absorber with simple orifices whose flow is subject to amplification from metered flow of another orifice when pressure differentials occur in said shock absorber.

A second principal object of this invention is to eliminate tapered metering pins.

A third principal object of this invention is to provide a diminishing flow without an internal perforated orifice tube.

A fourth principal object of this invention is to eliminate diminishing orifices in a shock absorber.

A fifth principal object of this invention is to provide a simple shock absorber which provides essentially uniform force resistance within a large range of velocities.

A sixth principal object of this invention is to provide a complex shock absorber response with a few working parts.

Another related object of this invention is to eliminate the peaks in shock force associated with pressure responsive valves or fixed orifices.

Another related object of this invention is to provide a shock absorber system which is capable of functioning in a simple high pressure liquid spring or hydrapneumatic spring.

Another related object of this invention is to provide a shock absorber which can be reduced in size.

Still a further object of this invention is to provide a simple shock absorber which can duplicate the ride resistance of an automobile shock absorber through all velocities.

Still another object of this invention is to reduce shock pressures for a given force.

Still another object of this invention is to provide a shock absorber which can be miniaturized.

Still another object of this invention is to provide shock absorption from all fluids, both liquid and gases.

Yet another object of this invention is to provide a shock absorber which relieves overloads without destroying itself.

Still a further object of this invention is to provide a shock absorber which has no adverse temperature problems.

Another principal object of this invention is to provide a shock absorber which can be mass produced from other hydraulic apparatus to achieve low-cost manufacturing.

Another principal cost object of this invention is to provide for a wide range of shock absorber functions with a common range of sizes and parts easily adapted for all shock purposes by simple low-cost procedures.

A related principal cost object is to provide a shock absorber for mass production uses.

An important cost object of this invention is to provide a low-cost shock absorber principle which, when combined with low-cost liquid springs construction, makes liquid springs competitive in mass production markets.

Still another principal cost object of this invention is to provide a shock absorber which is readily fabricated by semi-skilled help.

BRIEF DESCRIPTION OF THE DRAWINGS

The invention will be more readily understood by reference to the following drawings in which.

DESCRIPTION OF THE PREFERRED EMBODIMENTS

Figure 1:
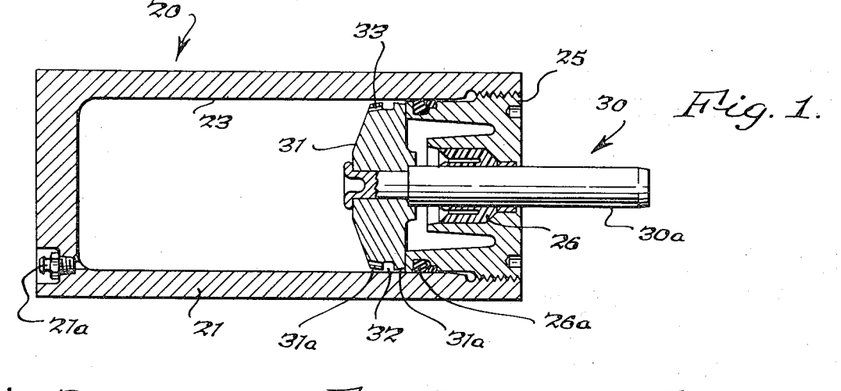
FIG. 1 is a longitudinal sectional view of a liquid spring shock with simple orifices arranged according to the principles of this invention.
Figure 11:
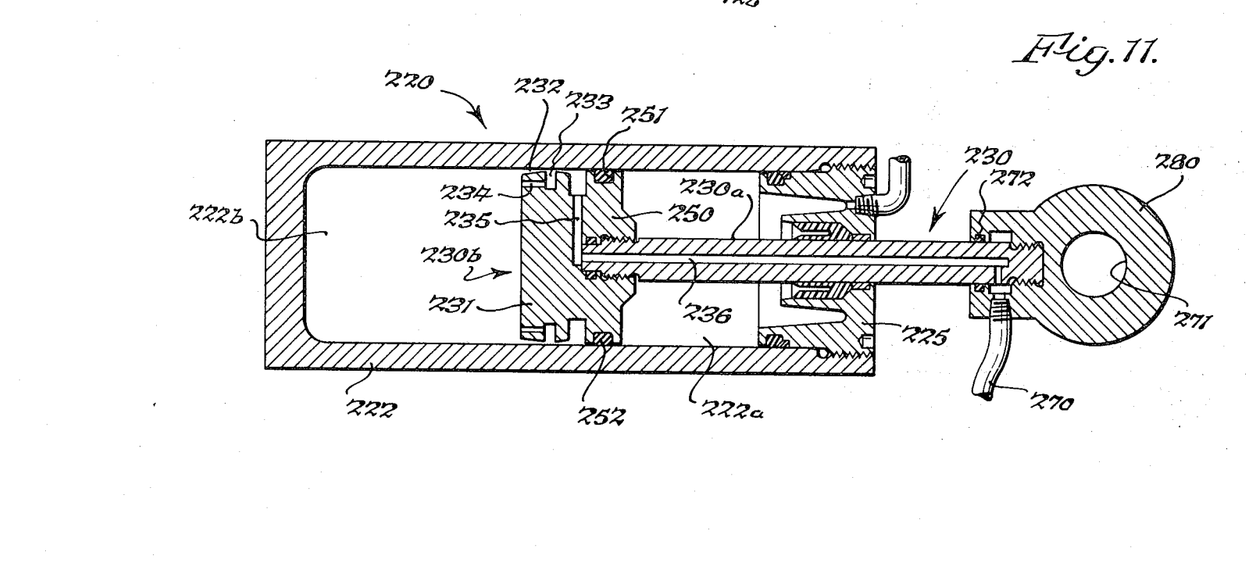
FIG. 11 is of a hydraulic or pneumatic cylinder which employs fluid dampening according to the teaching of this invention.

FIG. 1 illustrates the simplest form of Liquid Spring shock absorber 20 having one moving part, piston assembly 30, which performs the function of five pressure responsive valves to relieve 20,000 p.s.i. liquid, providing you could build pressure responsive valves for 20,000 p.s.i. Piston assembly 30 cylinder 21 and cap 25 with seal 26 and 26a being the bare minimum of parts normally associated with the simplest of fluid devices, a pneumatic or hydraulic cylinder or liquid spring shock. Please note that in a hydraulic cylinder, groove 32 would be a normal "0" ring groove, this liquid spring shock device with ports at 21a and an additional port 126 in cap 25, as shown in FIG. 11, is a hydraulic cylinder and it is intended that these common parts provide both liquid spring, liquid spring shock, hydrapneumatic shock or shock absorber, pneumatic and hydraulic cylinder thus effecting manufacturing economies permitting all these fluid products to be sold cheaper with resulting larger markets for each class of device.

The liquid spring shock 20, as is illustrated in FIGS. 1, 2, 3, and 4, being particularly designed for cushioning freight cars, has, for example, an O.D. of 12 inches, length of 24 ¾ in. and a stroke of 6 in. and providing 50,000 ft. lbs. of energy in a 24 ⅝ draft pocket of a standard freight car compared with 70,000 ft. lbs. in the standard friction draft gear it replaces. Amazingly, while other hydraulic railroad cushioners have been designed for this service, providing 150,000 ft. lbs. of energy absorption, they are conventional with an inner perforated shock tube providing internal pressures double this Liquid Spring Shock which is normally considered a high pressure device. This pressure advantage of fluid amplified dampening attests to the value of this invention in hydraulic shock applications. Using fluid amplified dampening one can provide more energy absorption in a given size, or lower pressures or reduced size of the shock absorber.

In the construction shown in FIG. 1, piston rod 30a is, for example, made of high strength maraging 350,000 psi. yield Nickle Alloy Steel material which is finished soft, assembled by riveting to previously hardened but not drawn piston head 31 of S.A.E. 4340 material. The entire piston assembly 30 is then heat treated at 900° F. which draws the piston head 31 to make it tough and simultaneously heat treats the maraging steel piston rod 30a to 350,000 p.s.i. yield. The entire assembly is then strong and tough with a small diameter liquid spring piston so internal pressures can be low for the spring function to match the low pressures for the shock force, permissible with this invention.

Figure 2:
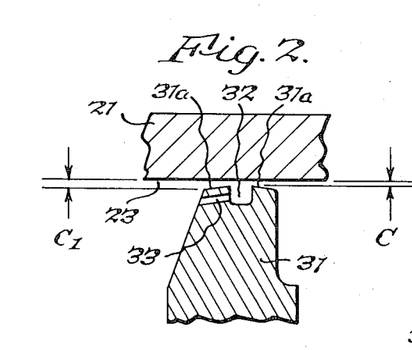
FIG. 2 is a fragmentary partial view of the fluid amplified orifices section of this device employing the principles of fluidics and illustrating the relative orifices shape, dimensions, and clearances to achieve this unusual effect.

We will now discuss in detail how this low pressure shock absorber operates. The annular collector ring 32 (preferably identical to an "0" ring groove) has a plurality of connecting drilled passages 33 in communication therewith. Ideally, piston head 31 has a slightly tapered or curved venturi like surface 31a, shown best in FIGS. 2, 3, and 4, on its exterior, although it can be flat or concave and work, although not as efficient flow-wise. Referring now to FIG. 2, this tapered surface provides a minimum clearance C and a maximum clearance $C_1$ to cylinder inner wall surface 23 as shown in enlarged detail in FIG. 2. This clearance (of any type), groove 32 and communication system 33 in any shape or combination when used with a moving piston, forms the essential ingredients of this fluid amplified flow invention for a shock absorber. The various types of amplified flow through in and around this labyrinth providing the equivalent of a metering pin, pressure responsive valve, metering tube, metering holes or any system for diminishing flow to provide uniform shock resistance (square card) in a shock absorber system. This is accomplished without reduction in piston area for metering pins, tubes, or pressure responsive valves with resulting lower pressures.

Figure 3:
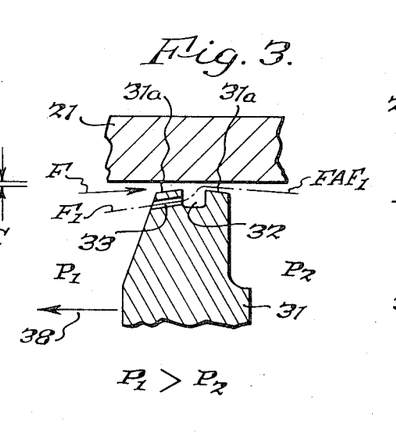
FIG. 3 is an identical view to FIG. 2 but illustrating the flow on compression of said liquid spring shock and the way in which that flow is amplified through the orifices.

Referring now to FIG. 3, it illustrates the manner in which fluid amplification, in accordance with velocity, takes place. The direction of the piston is in compression as shown in direction 38. Through the clearance $C-C_1$ a flow F is energized because of the difference $P_1$ (high pressure) and P or low pressure on either side of dashpot head 31. This pressure difference, if it is high, provides high flow through clearance $C-C_1$. If it is low, it provides low flow through clearance $C-C$. Normally, with a clearance of this type, there is a predetermined maximum flow point at which it can pass enough liquid, before the pressure peaks out on impact since the impact velocity is high initially. A normal orifice flow of this type through this annular or a hole orifice causes a very high peak with a declining pressure wave thereafter going to zero as the piston is decelerated to zero velocity. This is classic force response in any orifice shock absorber. It normally provides a 60 percent energy curve in which the area under the force line equals 60 percent of the area generated if the peak shock force was maintained over the entire stroke. To absorb a given energy with a known peak shock force, preferably twice the stroke must be provided to absorb this given energy. This doubles the shock absorber costs. Often the mechanism will not absorb this initial high "G" loading.

However, in this invention, as shown in FIG. 3, flow F passing groove 32 entrains with its flow $F_1$ from orifices 33 in proportion to its velocity by C. The exhaust fluid, therefore, $FAF_1$ is an amplified flow A of $FAF_1$ in direct proportion to the velocity which therefore provides the constant force graph FIG. 1A or a 95 percent efficient shock curve. This efficiency is never approached with conventional shock absorbers having just orifice flow and is difficult with a tapered metering pin or metering tube.

Figure 4:
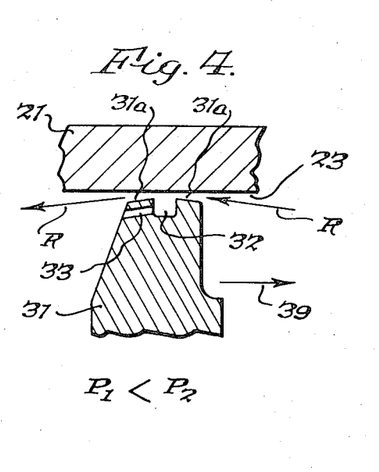
FIG. 4 is a view similar to FIGS. 2 and 3 illustrating how this flow is not amplified when the device is extending or on rebound.

In the railroad design of FIG. 1, for example, this would call for a reduction in piston size (raising pressures for a given shock force) to permit the introduction of a metering tube, the actual first design of this unit. This, in turn, provided pressures 30 percent higher with the smaller area of the original unit. In my design illustrated in FIG. 1, I, therefore, have a 95 percent efficient shock curve with a large low pressure dashpot, small piston rod for low liquid spring forces, and an efficient square energy curve without metering apparatus. Referring now to FIG. 4, the flow effect of an extension 39 after impact can be observed. Since in most like compressions for this rail shock one wishes to just initially accelerate the coupling to extend rapidly from zero reversal velocity and, thereafter, slow it down, a flow R between $P_2P_1$ is initiated which is preferably not amplified in accordance with this invention. Therefore, the velocity of piston 30 is initially smoothly accelerated, then is progressively diminishing on extension, in accordance with a low spring force and high flow resistance.

In FIG. 1, I illustrate heavy walls 21 on cylinder 20 which deflect slightly, thus enhancing flow by clearance C. By suitably changing the thickness of wall 21 to yield more, a pressure relief amplification can be obtained so that there is no flow limitation on this device. All pressure responsive valves have flow limitations after which the valve is damaged or the unit overloaded. This device tends to relieve its own overloads by its amplified flow and its wall deflection when it is properly designed.

Figure 1A:
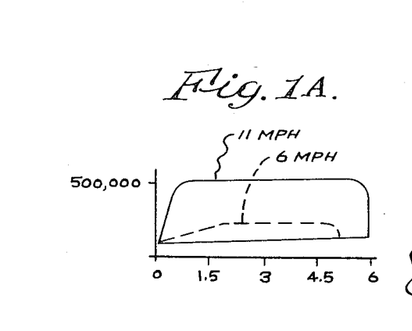
FIG. 1A is a graph illustrating the essentially square energy wave actually delivered from such a shock absorber.

FIG. 1A illustrates typical force stroke relationships for rail use of this novel liquid spring 20. As shown at 6 miles per hour, peak shock force of 220,000 pounds are provided with an initial low rate of "G" slope initially (force due to acceleration). At 11 miles per hour the curve is a very efficient 90 percent energy curve providing maximum absorption in a 6-inch stroke cushioning device of 250,000 foot pounds over 6.4 inches of stroke. This is accomplished with internal pressures 40 percent less than existing coil spring return railroad cushioners.

Figures 5, 5A:
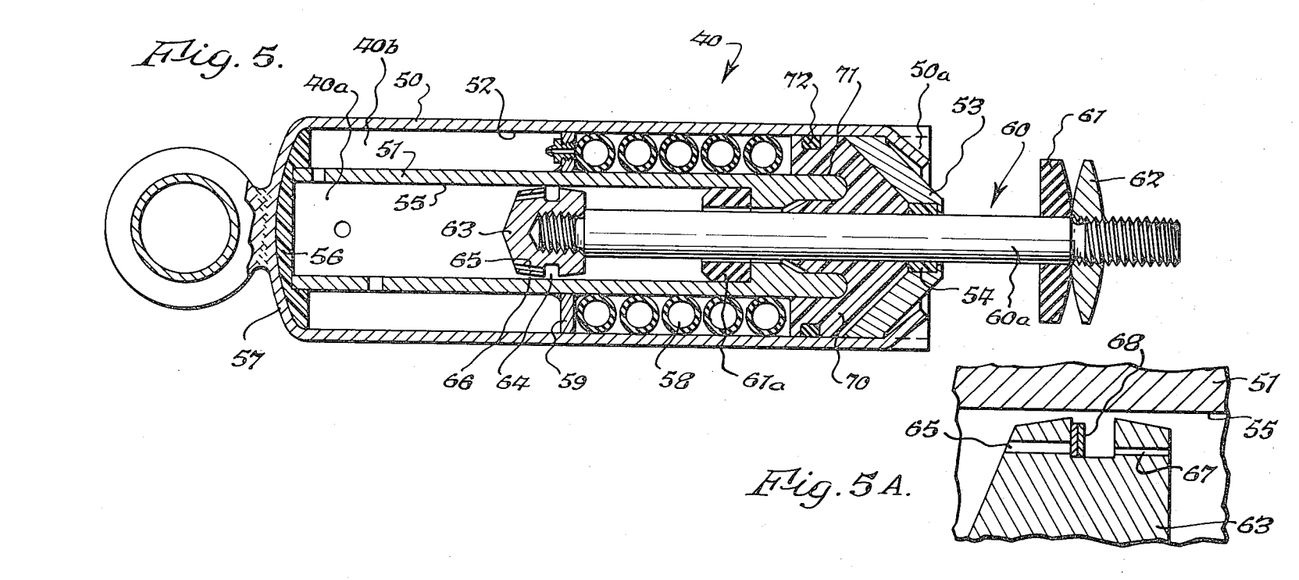
FIG. 5 is a longitudinal section view of a conventional automobile shock absorber without support spring forces and employing the principles of amplified flow in the shock absorber and an impact spring.
FIG. 5A illustrates an alternate dashpot head with a check valve to achieve differentials in amplified flow between compression and extension.

Referring now to FIG. 5, it shows a vehicle shock absorber suspension 40, normally used with a mechanical spring, having a cylinder 50 and a piston assembly 60. Cylinder assembly 50 has an inner shock tube 51 containing the high pressure on shock mitigation and bottoming in trepanned seal groove 71 on a seal 70. Elastomeric seal 72 seals against the bore 52 of cylinder 50 and end cap 53 has a guide ring 54 therein for preventing the extrusion of seal 70. Cylinder 50 is crimped at 50a.

Figure 6:
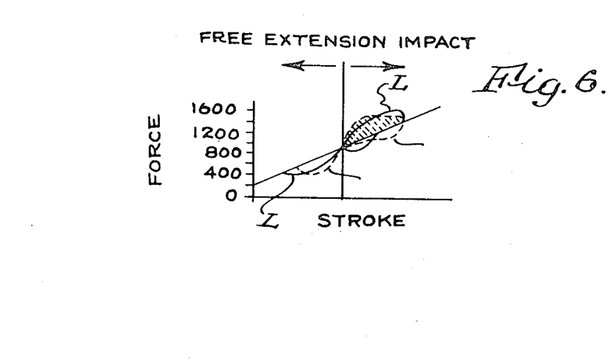
FIG. 6 is a graph showing how this device works from a position of rest, such as support height of a vehicle functioning as a liquid spring on impact.
Figure 7:
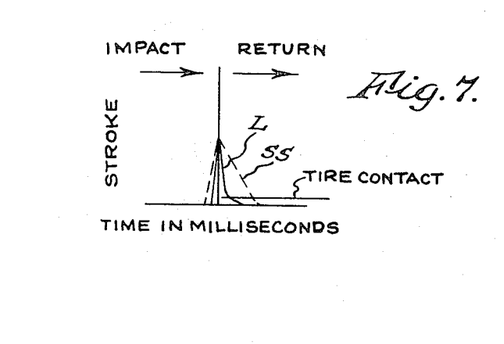
FIG. 7 is a graph illustrating the high speed return of a wheel controlled with this shock absorber due to its impact spring.

In accordance with my suspension teachings, piston rod 60A has a washer 62 thereon and elastomeric cushion 61 for taking impacts therewith. Piston head 63 has a collector ring 64 and a plurality of passages 65 which, with clearance 66 to the bore 55 of tube 51, provides the amplified orifice flow previously discussed. A plastic resilient end member 56 nests in the end 57 of the cylinder 50 to resiliently hold the tube 51 therewith. This is standard automobile configuration and can incorporate just gas head or the gas tubes 58 or other gas reservoir without the divider plate 59 to provide a configuration similar to all present automobile shock absorbers. It is preferable that it be used similar to an existing automobile shock absorber but with liquid spring characteristics on bump to restore the wheel to the pavement faster, as shown in FIG. 7. In accordance with that teach, stroke "L" denotes wheel return from liquid spring stored energy in the liquid chamber on sudden impact while curve SS with its slower return is the actual curve of a standard coil spring shock response used therewith. This is observed from actual tests. Curve "L" of FIG. 6 shows the actual stored spring energy, on bump, to accomplish this against the lost (cross hatched) energy of the conventional spring shock. As shown with divider plate 59, the device provides a spring energy stored system in that on impact divider plate 59 does not permit fluid to go through quite as rapidly as the rod displacement demands, and temporarily liquid spring pressure is built up in chambers 40a, 40b, which fires the wheel back to the pavement in accordance with the acceleration graph of FIG. 7. We, thus, find that the spring energy is stored to fire the wheel back to the pavement as shown in line L in accordance with my liquid spring patent, instead of the normal spring shock curves SS, with the exception that since flow now is between two sides of the dashpot rather than around the tube divider as in the reference patent, plate 59 can be used to contain gas tubes 58 providing a standard shock absorber for all situations except high impact when it behaves like a liquid spring. This, then, would provide the high speed wheel return L of FIG. 7 in place of the slower return SS characteristic of conventional shock absorbers. The new method of fluid amplified dampening shown herein permits this arrangement in a standard shock absorber.

It should also be noted that the configuration of FIG. 1 can be used for automobile shock absorber purposes and the outer cylinder 52 dispensed with; in effect, this would provide a device similar to FIG. 1 but in a liquid spring.

In FIG. 5A it is illustrated that dashpot head 63 having small passages 67 added thereto and a plate check valve 68 for closing off rebound passages 67 on compression and passages 65 on rebound. As noted, passages 67 are smaller because of the smaller rebound displacement of piston head 63.

Rebound control can also be obtained by combining the amplified dampening principles of FIG. 3,3A of my copending patent application Ser. No. 619,531. It is so intended herein that these combinations are possible.

Figure 8:
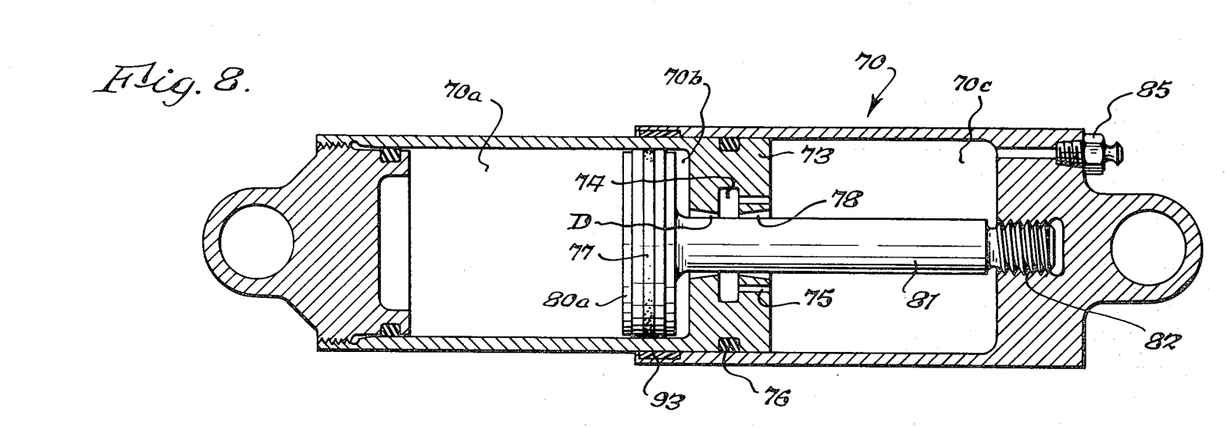
FIG. 8 is a longitudinal view of a tubular liquid spring or hydrapheumatic spring shock employing this fluid amplified flow in cooperation with an area reducing structural stud and a common orifice.

FIG. 8 illustrates a straight tubular liquid spring 70 built in accordance with U.S. Pat. No. 2,909,368 which has the capability of using gas in chamber 70a to supplement the liquid spring; liquid being contained in chambers 70b, and 70c. Chambers 70b and 70c are in communication through orifice 78 provided in the inwardly formed dashpot head 73. This configuration is similar to the more conventional air-oil shock struts used in aircraft, and the invention covered herein is intended to and will function with these more commonplace structures for shock mitigation.

Figure 9:
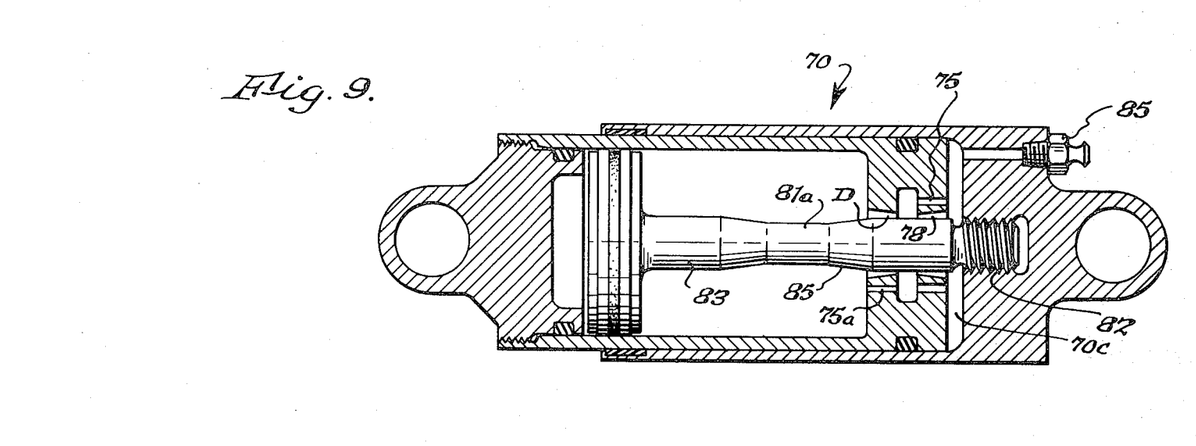
FIG. 9 is a section of a similar device collapsed, but using a step metering pin for a plurality of differential square topped energy waves.

The invention herein lies in the fluid amplifier dampening associated with straight metering stud shock 81 which, in this instance, serves only as area reduction of orifice 78 and structural support for piston head 80a and providing fluid amplifying control flow by providing clearance D. A collector ring 74 and plurality of connecting passages 75 function as noted before in FIGS. 2, 3, and 4. Stud 81 has the thread 82 and seal 77 to contain liquid of chambers 70b and 70c and separate the gas in 70a. Piston seal 76 acts to contain the liquid in chambers 70c and 70b and guide ring 93 guides the cylinder. Filler plug 85 is used for liquid filling. This system will also work with the stepped tubular spring of Pat. No. 2,809,368 or the metering pin tapered or straight of any air-oil shock system. In FIG. 9, I taper stud 81a up to shoulders 83 and 85 to provide stiffer end loads to illustrate that old configurations can be used with my novel concept of fluid amplofying shock absorbers. In practice, this step would be slight with fluid amplification to accomplish the same purpose. The stud would, thus, be stronger. It will, thus, be apparent that all existing shock metering principles of tapered pins, notched, deflecting or tapered cylinders, metering tubes, pressure responsive valves or any system, can be used with this novel system and an improvement in performance obtained. Actually, with this fluid amplifying principle, the critical tolerances of all the old system plus one-third the parts and costs are eliminated.

Figure 10:
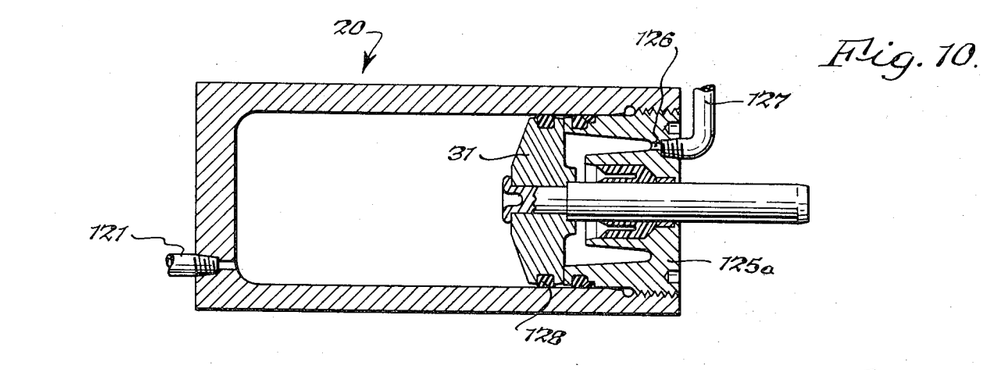
FIG. 10 is a view of a hydraulic cylinder made from the same component of the device of FIG. 1.

In FIG. 10, I illustrate how the liquid spring assembly 20 of FIG. 1 with the substitution of pipe 121 for liquid filler plug 21 and the addition of liquid port 126 and pipe 127 to cap 125a provides a hydraulic actuating cylinder assembly. Actually, with the addition of an elastomeric seal 128 to head 131, as shown in FIG. 10, I illustrate how the liquid spring shock assembly 20 of FIG. 1 with the substitution of pipe 121 of liquid filler plug 21 and the addition of liquid port 126 and pipe 127 to cap 125a provides a hydraulic actuating cylinder assembly. Actually with the addition of an elastomeric seal to groove 32 of piston 31 of FIG. 1, such a device could be provided. I prefer, however, because of costs, to eliminate passages 33 of FIG. 1 in piston head 31 to provide head 31 so that costs are lowered. In practice, heads 31 would be produced without passages 33 and inventory maintained in blank units of this type and as orders for shock absorbers were received passage 33 would then be added. We, thus, have one cylinder assembly adapted to both liquid spring, spring shock, or hydraulic or pneumatic cylinder and costs are thus reduced.

In FIG. 11, I illustrate a cylinder assembly 220 having an elongated cylinder 222, cap 225, and piston assembly 230. Piston head 230b thereon, which includes shock piston section 231 thereon. Piston head 231 has a metering section 232, 233, and 234 in accordance with my previous teachings herein. In addition, a spaced sealed head 250 is provided which acts as a sealed hydraulic piston by virtue of seal 251 in groove 252. A plurality of passageways 235 are provided communicating with bore 236 of piston rod 230a, cap 280, and flexible hydraulic hose 270. Cap 280 has an actuating pin eye configuration because of bore 271 and is sealed at 272 to provide a sealed cap.

The purpose of this configuration is to provide controlled resistance in an actuator system wherein on compression of the cylinder, controlled flow through fluid amplifying section 232 acts to control velocity and force. Such a system would work well with gas applied to chamber 222a and liquid in chamber 222b. It is thus intended that my fluid amplifying system work with all hydraulic, pneumatic, or shock absorption or liquid spring systems.

Figure 12:
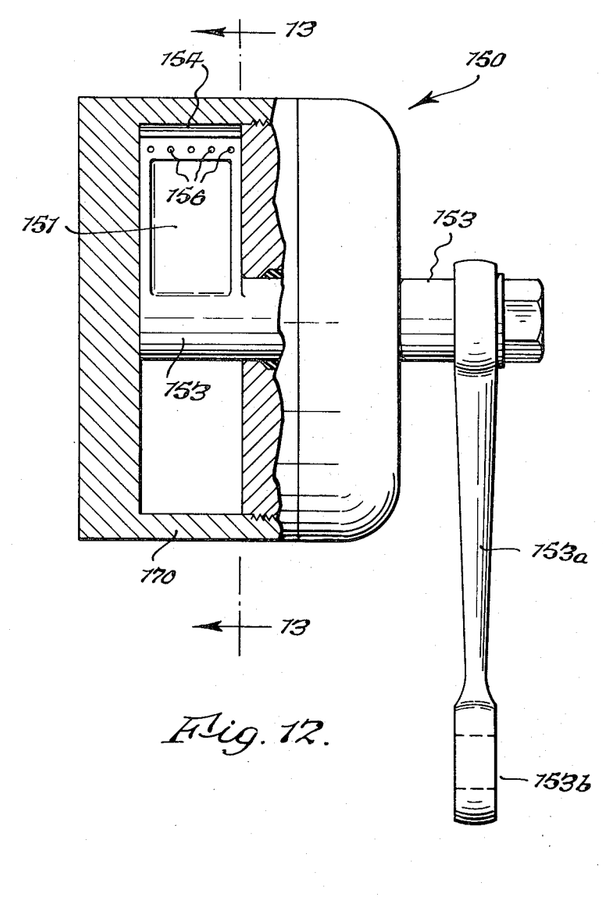
FIG. 12 is a similar view of a vane-type shock absorber employing this novel form of amplified flow dampening.
Figure 13:
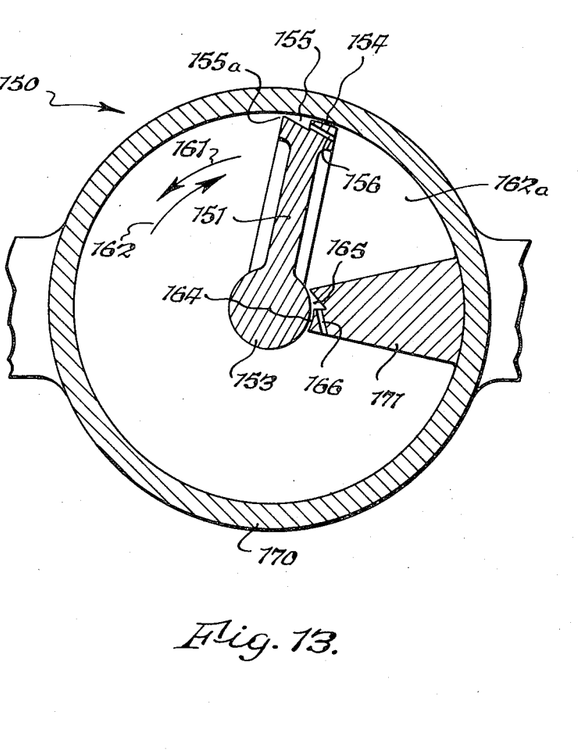
FIG. 13 is a sectional view taken as noted of the device of FIG. 12.

In FIGS. 12 and 13, I illustrate a rotary or oscillating vane-type shock absorber 150 which is identical to the vane-type shock absorbers used as shimmy dampeners and for shock absorbers on difficult military equipment where a telescoping shock absorber cannot be used. Similar configurations are quite often used on hydraulic door closures and were used on vehicles.

As shown in FIG. 12, a bell crank 153a is affixed to a rotatable shaft 153. Bell Crank 153a is generally attached at 153b to a lever arm connected to the work or the apparatus whose shock must be dampened. In practice, bell crank 153a is of sufficient length so that in the normal shock absorber application it will provide approximately a 90° to 120° sweep. Because of the novel dampening system we employ herein, it is contemplated that our shock absorbers will be permitted to sweep a chamber of approximately 300°, Thus, automatically, our rotary shock absorber will provide a more efficient energy package for a given size. This is entirely predicated on the use of the fluid amplified dampening described hereinbefore. The body of the cylinder 170, as shown in FIG. 13, has a divider wall 171 extending into the cylinder to its axis. This need be only a 20° angle in the shock absorber in our design; but in most designs using these principles, the divider walls 171 comprise approximately a 60° sweep of the cylinder which, with the two blades customarily used, provides a maximum travel of 120°. However, because of our novel dampening, only one blade 151, attached to shaft 153, is required, as will be discussed hereinafter. To utilize the greater travel now available, a gear could replace bellcrank 153a on shaft 153. Since most of these devices also require pressure responsive valves, the inwardly formed divider wall 171 generally includes pressure responsive valve with difficult porting and metering. We have herein eliminated these valves, the porting and metering, besides accomplishing a 300° shock absorbing stroke. Vane 151 has an annular gap 154 which is normally sealed on most vane-type shock absorbers. This clearance 154 provides less critical tolerances. Heretofore, this was a complicated sealing arrangement and is herein not required. A longitudinal collector groove 155 is provided in vane 151. A plurality of passages 156 connect thereto and to chamber 162a. Likewise, in the inwardly formed divider wall 171, a collector groove 165 and a clearance amplifying orifice 164 are employed. A series of passages 166 communicate with collector groove 165.

When the vane is accelerated in the direction 161, a sharp corner 155a of collector groove 155 restricts flow therethrough in accordance with an orifice co-efficient of 65 percent. Meanwhile, rotation of hub 153 is accelerating fluid flow through clearance 164 causing an amplified flow from collector groove 165. We thus have a square top energy wave generated by movement in this direction. Since the amplified flow velocity is smaller at the center of the unit, this would generally be used, for instance, to control rebound such as on an auto shock absorber.

Conversely, to take care of heavy bounce, the vane would move in the direction 162 into chamber 162a, causing high velocity flow at 154 which would amplify flow through collector 155 and passages 156. We, thus, provide an amplified shock absorber on bounce which, because of the large diameter sweep of vane 151 at the outer extremity of cylinder chamber 170, provides large amplified flow at 154 and 155 for the bounce of the vehicle while the amplified flow at 164 and 165 on rebound is in accordance with a predetermined return velocity of a wheel from a given point, which velocity is due to the acceleration of the spring only. While I have discussed this in connection with vehicle suspensions, it is obviously suited for may differential velocity situations. Since the vane traverse such a large chamber, this device provides twice the energy of a conventional vane-type shock absorber. It should be noted that the flow control orifice and collector groove shown here have also been used on telescoping shock absorbs, such as on FIG. 1 through FIG. 11.

Although the unique shock absorber assemblies of this invention are characterized by a number of unique properties, it should be particularly noted that high efficiency shock curves are developed by means of entrainment of fluid flowing through the orifices which interconnect the piston head or vane transverse surface and the indentation formed in the peripheral surface of the head or vane. This entrainment is caused by the high velocity fluid flowing through the fluid passage clearance between the head or vane and the chamber housing the head or vane.

It should also be noted that the shock assemblies of this invention can replace metering pins, metering holes, and pressure responsive valves of conventional shock absorbers without any appreciable loss of shock absorption properties.

Moreover, the shock assemblies of this invention permit fluid passing the piston head or vane (clearance) to accelerate flow through the plurality of orifices to provide a shock resistance in accordance with tapered metering pins, graduated orifices, or pressure responsive valves, without any of the deficiencies or high cost associated with such devices.

In shock absorbers utilizing either metering pins or metering tubes, the tube or area of the metering pin is normally quite substantial as a result of rigid structural requirements. This structural requirement and consequent large area, reduces the area for shock mitigation and, therefore, raises operating pressures. The device of this invention, however, operates at low pressures. For example, the shock absorbers of this invention, when used on an ingot mold car, have a peak force of 120,000 versus 180,000 pounds for conventional shock absorbers and an increase in energy absorbed from 108,000 inch pounds to 150,000 inch pounds for a stroke of 1 ⅝ inches. Accordingly, a car weighing 14,000 pounds can be dropped 15 feet, using the shock absorbers of this invention versus only 11 feet for conventional shock absorbers.

It should be understood that various modifications and changes in the embodiments discussed herein can be made without departing from the spirit and scope of this invention.

I claim:

1. In a shock absorber having a housing means adapted to hold a body of fluid and sweeping means rotatably disposed within said housing means, said sweeping means having a circumferial peripheral surface adjacent said housing means and a transverse sweeping surface, the improvement comprising said sweeping means having a first unrestricted fluid passage clearance between said housing means and said peripheral surface for fluid therebetween and at least one opening formed in said sweeping means between the axis of said sweeping means and the peripheral surface thereof, said opening being substantially parallel to said first fluid passage clearance and providing a second unrestricted fluid passage for the flow of fluid, the flow of fluid through said first fluid passage clearance intersecting the flow of fluid through said second fluid passage to accelerate and amplify the flow through said second fluid passage.

2. The shock absorber of claim 1 wherein said housing means is a cylinder and said sweeping means is a vane.

3. The shock absorber of claim 1 wherein said second fluid passage comprises a plurality of orifices formed between the peripheral surface of said sweeping means and the axis of said sweeping means.

4. The shock absorber of claim 3 wherein said plurality of orifices provide a plurality of longitudinal collector grooves for said sweeping means.

5. The shock absorber of claim 1 wherein a divider wall is provided for said housing means, said divider wall extending from the inner surface of said housing means inwardly to the axis of said sweeping means, said divider wall further providing a fluid passage clearance between said sweeping means and said divider wall.

6. The shock absorber of claim 5 wherein said sweeping means is a vane rotatably mounted on a shaft member and said divider wall extends inwardly from the inner surface of said housing means to the axis of said vane and provides a first fluid passage clearance between said shaft member and the peripheral surface of said divider wall, said divider wall also having at least one opening formed between the peripheral surface of said vane and the inner surface of said housing means, said opening being oriented in the same flow direction as said first fluid passage clearance and providing a second fluid passage for the flow of fluid, whereby the flow of fluid through said first fluid passage clearance accelerates the flow of fluid through said second fluid passage.

* * * * *

UNITED STATES PATENT OFFICE
CERTIFICATE OF CORRECTION

Patent No. 3,698,521            Dated Oct. 17, 1972

Inventor(s) Paul H. Taylor

It is certified that error appears in the above-identified patent and that said Letters Patent are hereby corrected as shown below:

Column 11, line 9, after "fluid" insert --flow--.

Signed and sealed this 3rd day of July 1973.

(SEAL)
Attest:

EDWARD M. FLETCHER, JR.        Rene Tegtmeyer
Attesting Officer               Acting Commissioner of Patents